United States Patent [19]

Crisp

[11] Patent Number: 5,341,379
[45] Date of Patent: Aug. 23, 1994

[54] DATA ERROR DETECTION IN DATA COMMUNICATIONS

[75] Inventor: George E. Crisp, Melbourne, Australia

[73] Assignee: Signalling Technology Pty Ltd., Seaford, Australia

[21] Appl. No.: 860,516

[22] PCT Filed: Dec. 20, 1990

[86] PCT No.: PCT/AU90/00601
§ 371 Date: Jun. 15, 1992
§ 102(e) Date: Jun. 15, 1992

[87] PCT Pub. No.: WO91/10304
PCT Pub. Date: Jul. 11, 1991

[30] Foreign Application Priority Data

Dec. 22, 1989 [AU] Australia ............... PJ7991

[51] Int. Cl.⁵ .............................. G08C 25/00
[52] U.S. Cl. ............................ 371/6; 371/25.1; 371/37.2
[58] Field of Search ........... 371/6, 25.1, 32, 37.2, 371/37.7, 65; 375/88, 95

[56] References Cited

U.S. PATENT DOCUMENTS

| | | |
|---|---|---|
| 3,562,710 | 2/1971 | Halleck . |
| 3,638,183 | 1/1972 | Progler et al. . |
| 4,118,686 | 10/1978 | Lender ............ 371/6 |
| 4,815,107 | 3/1989 | Kishimoto et al. . |
| 4,922,493 | 5/1990 | Kase ............... 371/6 |
| 4,967,415 | 10/1990 | Tanagawa ........ 371/6 |

FOREIGN PATENT DOCUMENTS 62-286334 12/1987 Japan .

Primary Examiner—Vincent P. Canney
Attorney, Agent, or Firm—Robert F. O'Connell; Kevin J. Fournier

[57] ABSTRACT

A system for detection of errors in received data can also provide for the correction of errors so detected. The system has a FSK decoder section (10), an error detection module (24) and an error correction module (12). The received data, RXSIGIN, is bandlimited by bandpass filters (14), with the resultant waveforms provided to the error detection module (24) on lines (29). The FSK decoder section (10) also decode the digital data RXDATA within RXSIGIN, and provides RXDATA to both the error correction detection module (24) on line (21) and the error correction module (12) on line (33). Error detection takes place on a bit-by-bit basis by comparison of the resultant waveforms being compared against an ideal representation thereof, a quality factor is ascribed to each bit on the basis of the comparison, and a determination of which bits are suspected to be in error is made by comparison of the quality factor against a threshold value (30). The system provides the advantages that error detection can be performed on a real time bit-by-bit basis without requiring substantial processing power, while increasing reliability and the speed of overall system signalling throughput.

10 Claims, 4 Drawing Sheets

DATA ERROR DETECTION IN DATA COMMUNICATIONS

TECHNICAL FIELD

This invention relates to apparatus for use in communication systems for the detection of data errors, and relates in addition, but not exclusively, to correction of data in which errors have been detected.

BACKGROUND OF THE INVENTION

Data error detection techniques are well known in digital data communications, with the simplest of these being parity checking. A failing of the parity checking technique is that if more than one data bit is received in error, the errors could be self defeating and the parity check may falsely be held to be correct.

An improvement of the simple parity check is to do a parity check in two dimensions. This is commonly known as a longitudinal redundancy check. This system is also not fail-safe, as errors in two bits of one word and errors in the same bits of another word will not be detected.

A further known system is the checksum technique, where the binary values of all data bits are added together (discarding overflows) and sent with the data. As before, two errors in the same bit in different data words can cause an error not to be detected.

An improvement on the former techniques is the so-called cyclic redundancy checking (CRC) technique. This technique takes data bits in each data word and performs a unique logical operation on those bits, usually determined by a higher order polynomial formula. The result of this operation is a binary check character (BCC), which is then appended to the data bits for transmission.

At the receiver, the same routine is performed on the received data bits and the result is then compared to the received BCC. If the two BCC's are in error, there is scope for error correction by subsequent bit reversal of suspect data bits, however, if the BCC itself is in error, then the correct data word can not be determined. The cyclic redundancy check, if incorrect, requires substantial processing power in order to complete the necessary computations to attain correction before the arrival of a subsequent data word.

Other data error correction techniques such as forward correction are known. These techniques require powerful processing to cope with the large amount of redundant information that necessarily must be included in order that the correction can be performed. Once the processing power required increases, so to does the complexity, size and cost of the integrated circuitry by which it is implemented.

A number of earlier communication systems have addressed in a different manner the problem of determining whether a received RF waveform might contain errors. These systems are concerned primarily with the signal to noise ratio of the decoder input signal, which, if below a certain value is thought to indicate the presence of suspect bits.

Deficiencies in such systems are firstly, that in the detection process (typically involving an amplitude detection circuit having elements such as diodes, resistors and capacitors), decoded bits are delayed in time for many bit periods due to the smoothing effect of the detection circuit, thus making correlation between a suspect bit and the baseband signal during the instant of that bit uncertain. Secondly, there are questionable relations between the baseband signal to noise ratio and the decode quality. The presence of noise may enhance the received waveform rather than degrade it depending on the characteristics of the noise itself, thus making the detecting of suspect bits unreliable.

The present invention attempts to overcome problems inherent with the known devices and techniques, by providing a simplified error detection system, not requiring the substantial processing power of prior art systems.

DISCLOSURE OF THE INVENTION

Therefore, according to one aspect of the invention, there is provided a method for the detection of data bit errors in a received data transmission, comprising the steps of:

(a) comparing the waveform of the received transmission with a stored ideal representation of the waveform on a bit-by-bit basis;

(b) ascribing a quality factor according to the comparison for each bit;

(c) determining which bits are acceptable or are suspected to be in error by a comparison of the quality factor for each bit against a threshold value; and (d) indicating suspected data errors if there is an error or errors determined.

Most preferably, the method further involves the step of (e) signalling those bits suspected to be in error.

In accordance with a further aspect of the invention there is provided apparatus for detection of data bit errors in a received data transmission, comprising:

means for storing an ideal representation of the waveform;

means for comparing the waveform of the received transmission with the stored ideal representation on a bit-by-bit basis;

means for ascribing a quality factor on the basis of the comparison for each bit;

means for determining which bits are acceptable or are suspected to be in error by a comparison of the quality factor for each bit against a threshold value; and means for indicating data errors if there is an error or errors detected.

Most preferably there is also provided means for signalling those bits suspected to be in error.

BRIEF DESCRIPTION OF THE DRAWINGS

In order that the invention be more clearly understood, a preferred embodiment will now be described with reference to the accompanying drawings, in which.

DESCRIPTION OF PREFERRED EMBODIMENTS

It is useful to describe a preferred embodiment with reference to a mobile radio system, however, the invention is equally applicable to other forms of data communication, including land-line (non-broadcast) types.

Such a system typically has a base station and a number of mobile units, all of which communicate with each other.

The system may operate by the technique of frequency shift keying (FSK) modulation of data words, transmitted typically at 1200 baud. The FSK technique in this example is two tone, operating at 1200 Hz and 1800 Hz, and the transmitted data is in 64 bit data words comprising 48 data bits with 16 BCC bits appended thereto. A 1200 Hz waveform represents logic 1, whereas a 1800 Hz waveform represents logic 0.

Figure 1:
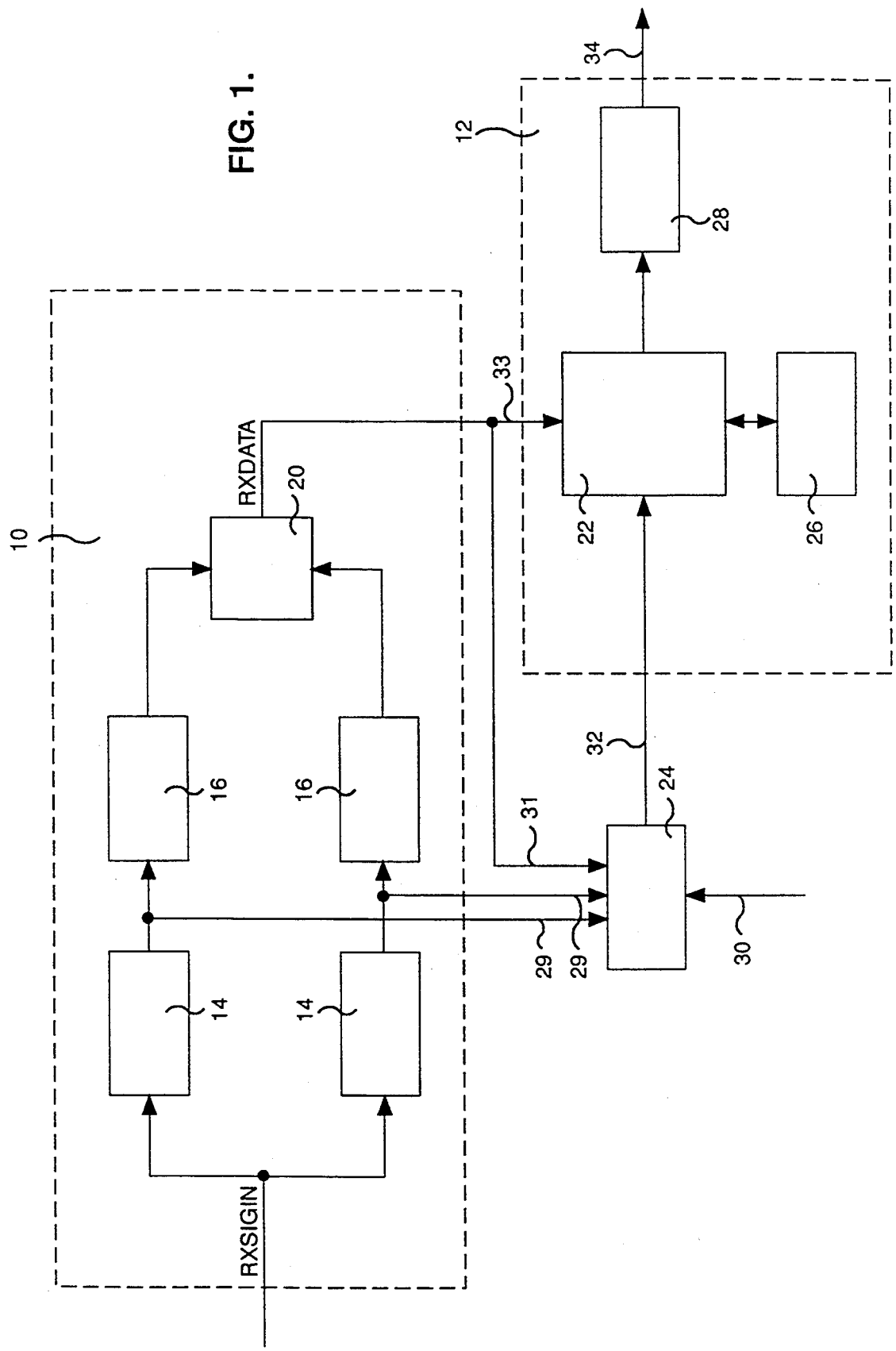
FIG. 1 shows a block diagram of a system constructed in accordance with the invention.

With reference to FIG. 1, there is shown a block representation of part of a receiving system in any one of the mobile units or the base station. The block diagram representation can be realised in software, and therefore need not be constructed of discrete components as shown in the figure.

The system comprises an FSK detector section 10, an error detection module 24 and a data processing and error correction section 12. The FSK modulated RF radio signal is demodulated to baseband by a conventional radio receiver (not shown). The resultant is a baseband FSK waveform, RXSIGIN, which is input to the FSK detector 10.

As the received signal RXSIGIN usually is corrupted during transmission, and therefore the detected signal RXDATA signal may contain one or more data bits in error. Ideally, the bits in error must be detected, and as an extension, corrected to provide accurate communications between all units in the mobile radio system.

The detector 10 functionally behaves in part as two bandpass filters 14 having centre frequencies of F1 and F2 respectively, corresponding to the two keying frequencies of 1200 Hz and 1800 Hz. Each bandpassed waveform output from the filters 14 is then detected by level detectors 16 to extract the analogue data from the respective tone carriers. These resultant bandpassed analogue signals are provided to the analogue to digital convertor (A/D) 20 to produce the digital data, RXDATA. The RXDATA signal contains data words plus timing (framing) information inserted at the time of transmission.

The RXDATA is passed to the error correction section 12 on line 33, and to the error detection module 24 on line 31. The error detection module 24 has the function of providing the detection of suspected bit errors, which, in the RXSIGIN signal would manifest themselves as abberations of the sinusoidal waveform, and indicating those suspected data errors to the error correction section 12.

The error detection procedure generally takes place firstly by the tone separated FSK waveforms being provided to the error detection module 24 on lines 29. The module 24 compares the actual received waveform on a bit-by-bit basis for each of the two tone FSK signals against a corresponding ideal FSK waveform stored in the module 24, using the coincident RXDATA as a timing reference and also as a determinant of whether the waveform is nominally a logic 1 or logic 0 representation.

The comparison generates a quality function, which typically ascribes a numerical value in the range of 0 to 20 for each bit, where 0 represents no quality and 20 represents perfect quality.

The quality factor of each bit is then compared to a defined threshold value to determine whether each bit is suspected to be in error or not. Those bits falling below the threshold are indicated to be in error. In the preferred embodiment, such suspected data bits are signalled to the data processing unit 22 in the error correction section 12. The threshold can be static or dynamically alterable, even to the extent where it can be selected by a user, as is shown on line 30.

It would be equally applicable to provide the quality factor for external processing.

It is important to realise the embodiment does not suffer from the disadvantages of conventional FSK detectors which have filtering systems that introduce time delays, hence make actual bit-by-bit analysis impractical.

In one preferred embodiment, the FSK detector 10 utilises a digital analysis method, which effectively squares the baseband waveform RXSIGIN before performing digital decoding. In such a way both the error detection and correction is virtually level independent, and do not suffer from the undesireable time delays inherent in conventional decoder systems.

Figure 2:
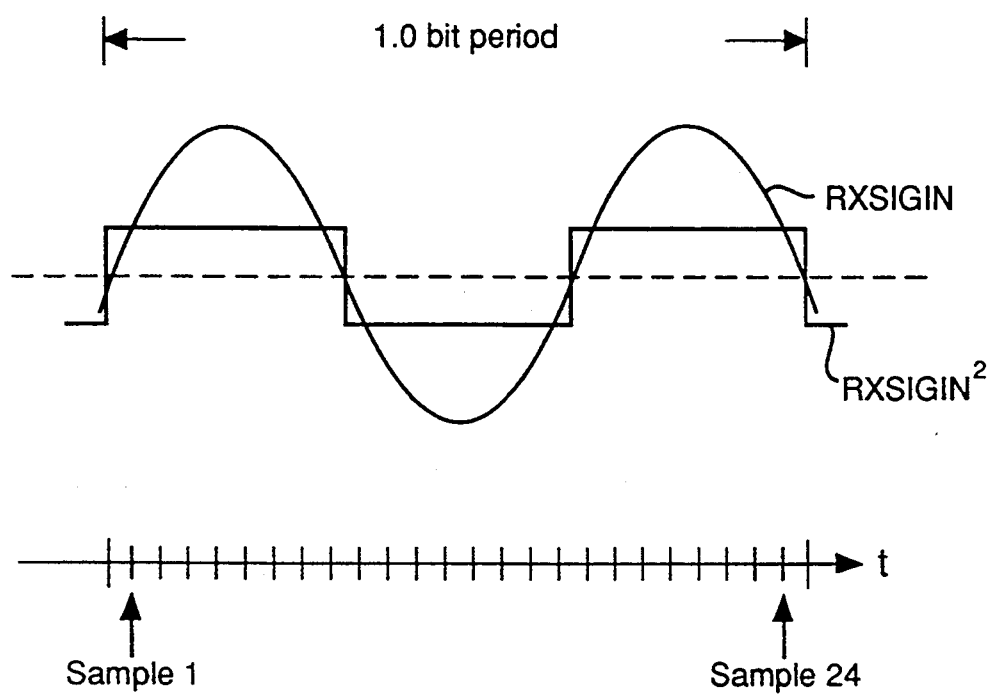
FIG. 2 show an example of the RXSIGIN waveform and its squared representation which are provided for error detection.
Figure 3:
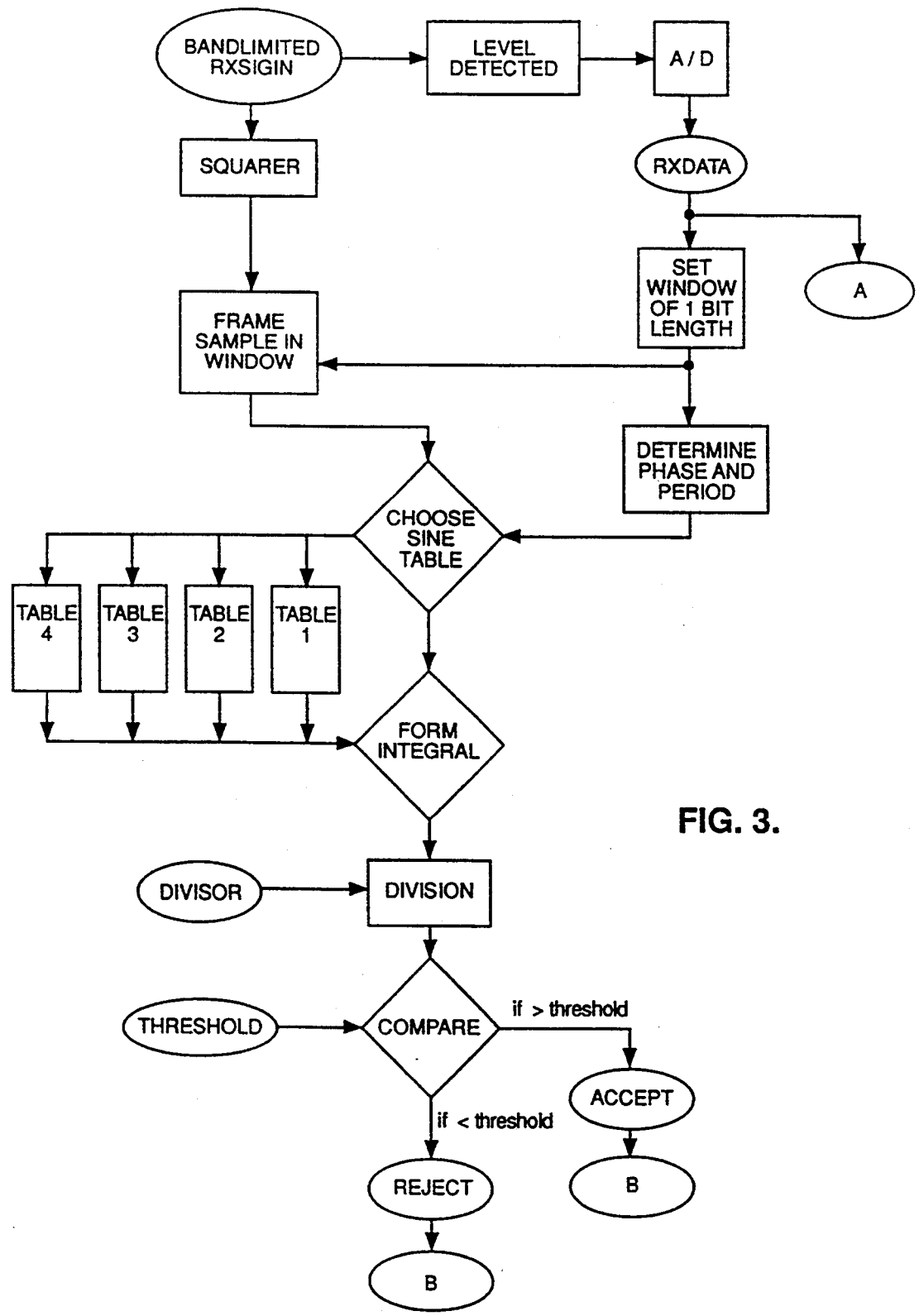
FIG. 3 shows a flow diagram detailing the error detection and correction procedures.
Figure 3A:
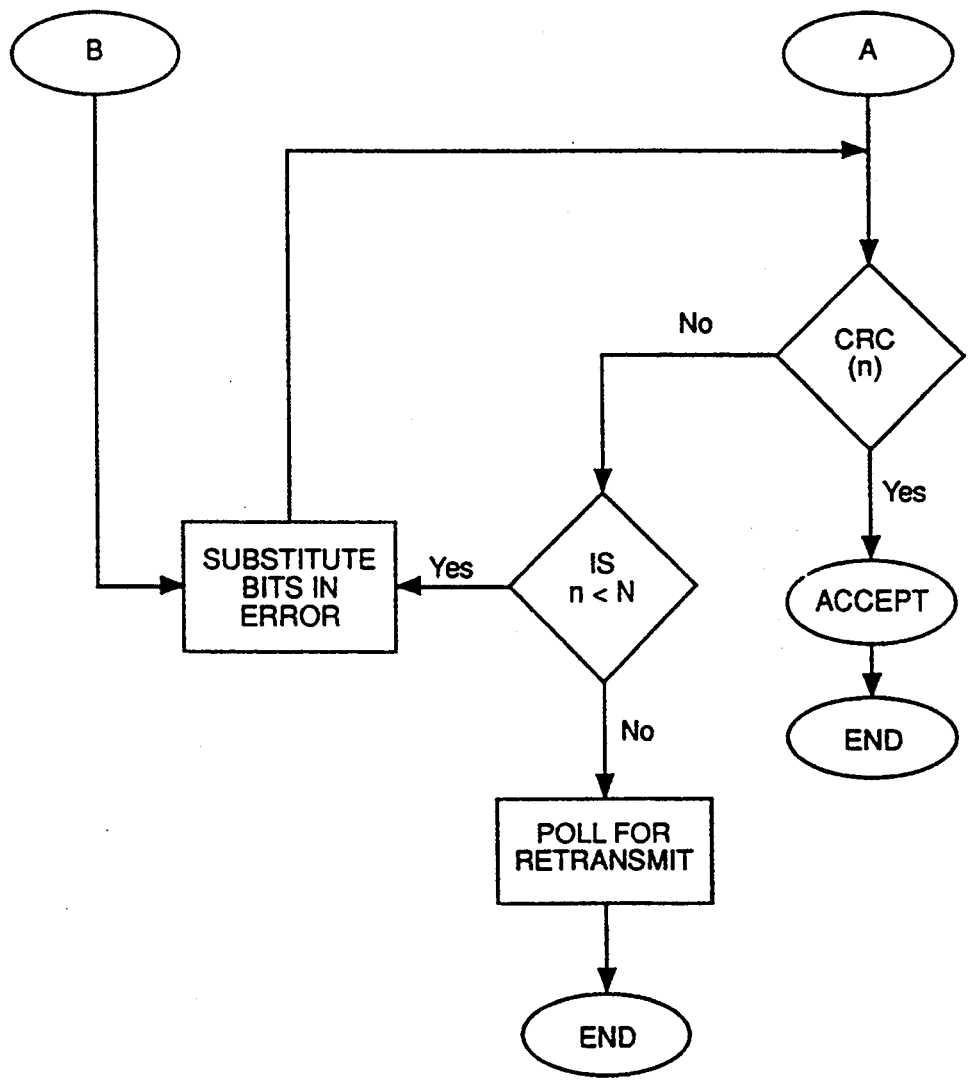

Describing the comparison and quality factor determination procedure in more detail, and with reference to FIGS. 2 and 3.

The procedure commences with bit synchronization being carried out within the FSK detector 10 by the level detectors 16 and A/D 20 to achieve the digital data stream RXDATA. Once bit synchronization is achieved, a window of 1.0 bit length is determined from RXDATA on a bit-by-bit basis. The 1.0 bit length corresponds to 1 complete period of 1200 Hz and 1.5 periods of 1800 Hz.

The FSK detector 10 also determines the data bit period, ie., either 1.0 or 1.5 periods within the 1.0 bit window and the phase (positive or negative) from the bit of the RXDATA signal undergoing error detection. This is provided to the error detection module 24 on line 31, and determines the correct sine table, being the respective stored ideal representation of the squared RXSIGIN signal, which is required in order to conduct the correct comparison for the bit being decoded. There are four possible sine tables relating to positive or negative phase and 1.0 or 1.5 periods.

Reference is made to FIG. 2 which shows the RXSIGIN signal (at 1800 Hz) framed by the 1.0 bit window, and also shows, superimposed, the same RXSIGIN signal squared. Both RXSIGIN and RXSIGIN squared are almost ideal for this one bit, and in practice are likely to be less regular in shape having suffered corruption during transmission.

The squared representation of FIG. 2 is then sampled at a number of points along the time axis (typically 24 per 1.0 bit window), and an integral is then formed by adding the contributing probability value from the respective sine table for each correct sample, and deducting the probability value if the sample is of incorrect phase. The respective sine table is effectively a stored ideal representation of RXSIGIN squared, and the comparison for each of the 24 points within each 1.0 bit window checks for correct phase (positive or negative) and phase change throughout the 1.5 periods in this example. The 24 points are chosen in time not to coincide with a nominal zero-crossing point.

In a typical sine table, the 24 samples for the above bit period of 1800 Hz would be assigned the following values:

| TIME SAMPLE: | CONTRIBUTION IF CORRECT COMPARISON | CONTRIBUTION IF INCORRECT COMPARISON |
| --- | --- | --- |
| 1 | +1 | −1 |
| 2 | +3 | −3 |
| 3 | +4 | −4 |
| 4 | +5 | −5 |
| 5 | +5 | −5 |
| 6 | +4 | −4 |
| 7 | +3 | −3 |
| 8 | +1 | −1 |
| 9 | +1 | −1 |
| 10 | +3 | −3 |
| 11 | +4 | −4 |
| 12 | +5 | −5 |
| 13 | +5 | −5 |
| 14 | +4 | −4 |
| 15 | +3 | −3 |
| 16 | +1 | −1 |
| 17 | +1 | −1 |
| 18 | +3 | −3 |
| 19 | +4 | −4 |
| 20 | +5 | −5 |
| 21 | +5 | −5 |
| 22 | +4 | −4 |
| 23 | +3 | −3 |
| 24 | +1 | −1 |

It can be seen that this table contains integer approximations of the sine function. The total integral for a perfect pattern in this case would be the sum of all probabilities which is +78. This value, which is the quality factor for each bit, would then be rationalised by simple division into the range of 0–20 to allow a convenient and direct comparison to the selected threshold. If the divided result is above this threshold, a binary 'accept' (digital 1) is signalled or output on line 32 from the module 24, otherwise a binary 'reject' (digital 0) is output on line 34. This output occurs at the same moment as RXDATA is input to the error correction section 12 on line 33, allowing immediate and dynamic assessment of the quality of received data.

It can be seen from the table that the values close to the centre crossover line of the squared sine wave are of the least contributing value as they are logically most easily corrupted by any noise content present at the FSK decoder 10 input. In the final analysis, bits within a data stream that have been most effected by noise will give the lowest integral value, and as a result will be signalled in real time as suspect.

Describing now the extension of error correction procedure.

The error correction section 12 includes a data processing unit 22 which contains all necessary processing functionality for conducting a cyclic redundancy check as is well known, together with the error correction function. The processing unit 22 also comprises memory ROM/RAM configuration 26 serving the data processing unit 22, and an interface 28.

When the RXDATA signal is passed to the data processing unit 22, the data processing unit 22 conducts a cyclic redundancy check on the received data bits in each data word, comparing the generated BCC with the appended received value. If there is no agreement between the two BCC's, then the function of the error correction module 24 is utilised to facilitate error correction. If the CRC is successful in the first instance, the data word is passed to the external interface 28, and thence outputted as processed data on line 34.

Assuming that the initial CRC failed, and the module 24 has determined one or more bits as suspected to be in error, and has signalled these bits to the data processing unit 22. The data processing unit 22 then substitutes the complementary logic value with respect to the value provided by the RXDATA signal for each suspect bit, and reperforms the cyclic redundancy check.

If the result of this subsequent check gives accordance between the BCCs, the validated data is passed to the interface 28 which outputs the processed data. The processed data can be used for further processing by a display device or other indicator means.

If the result does not give accordance between the BCCs, it is possible to attempt all logic value combinations of the suspects bits and reperform the cyclic redundancy check. It may be preferable to limit the maximum number of suspect bits for which all combinations are retried to three, in order to avail the system sufficient processing time before the next data word must be processed.

The error correction technique is also capable of correcting errors in the received BCC.

If, as a result of multiple error correction attempts the error can not be corrected, it would be necessary to poll the transmitter to resend that data word.

In another embodiment, a system incorporating the error detection function could be implemented to provide an indication of the signal strength, and therefore quality of RF input signals inputted to a receiver, thus reducing or eliminating the need for critical carrier and/or noise squelch detector circuits.

Furthermore, in the case of scanning receivers, the error detection function could be used to determine the strongest channel by dynamically adjusting the threshold level on each channel scanned, thus providing a relative indication of the signal strengths on each channel. Such information could then be used by a mobile unit in a mobile radio system to lock on to the strongest channel, which has application in so-called mobile voting systems, or even to provide an indication of the approximate location of the mobile unit.

The previously described embodiments illustrate an error detection and correction technique which has the advantages of providing improved error detection performance without requiring substantial processing power, thereby allowing simplified design, reducing cost, increased reliability, and increased overall system signalling throughput speed. Analysis of the actual demodulated FSK signal, rather than using the host RF carrier signal to noise ratios as a reference as in prior art systems, results in accurate dynamic signalling of bits in error for subsequent error correction.

I claim:

1. A method for the detection of bit errors in a received transmission, comprising the steps of:
    (a) comparing the waveform of the received transmission with a stored ideal representation of the waveform on a bit-by-bit basis;
    (b) ascribing a quality factor according to the comparison for each bit;
    (c) determining which bits are acceptable or are suspected to be in error by a comparison of the quality factor for each bit against a threshold value; and
    (d) indicating suspected data errors if there is an error or errors determined; wherein step (a) includes
        (i) squaring the waveform,
        (ii) decoding the waveform to provide a digital data stream;

(iii) synchronizing the digital data stream in 1.0 bit windows;

(iv) determining a respective sine table to be used in a comparison with the squared waveform for each bit as determined from the phase and period of the 1.0 bit window;

(v) sampling the squared waveform at a number of points in time within the 1.0 bit window; and (vi) performing a comparison of phase between each sampled point of the squared waveform and an expected value of phase for an ideal waveform as determined from the respective sine table;

and wherein step (b) includes (i) forming an integral by adding a probability value from the sine table for each correct value of phase or deducting a probability value from the sine table for each incorrect value of phase; and (ii) dividing the integral by a factor to rationalize the integral value;

and wherein step (c) includes comparing the quality factor with the threshold value, and if the quality factor is above the threshold value the bit is accepted, and if the quality factor is not above the threshold value the bit is suspected to be in error.

2. The method of claim 1 comprising the further step of (e) signalling those bits suspected to be in error.

3. A method as claimed in claim 1, comprising the further steps of:

(f) performing an error checking procedure on digital data stream;

(g) in the event of an unsuccessful error check, substituting the complementary logic value to that utilised for the unsuccessful error check for those bits corresponding to the bits suspected to be in error; and (h) reperforming the error checking procedure.

4. A method as claimed in claim 3, wherein the error checking technique is a cyclic redundancy checking technique.

5. A method as claimed in claim 4, comprising the further step of repeated reperformance of the cyclic redundancy check using all possible combinations of logic levels for the bits detected to be in error.

6. A method as claimed in claim 5, comprising the further step of requesting retransmission of data if the cyclic redundancy check does not result in any successful error check.

7. A method as claimed in claim 5, wherein the repeated reperformance is attempted only if three or less bits in any data word of the digital data stream are determined to be in error.

8. Apparatus for detection of bit errors in a received transmission, comprising:

means for storing an ideal representation of the waveform;

means for comparing the waveform of the received transmission with the stored ideal representation on a bit-by-bit basis;

means for ascribing a quality factor on the basis of the comparison for each bit;

means for determining which bits are acceptable or are suspected to be in error by a comparison of the quality factor for each bit against a threshold value;

means for indicating data errors if there is a suspected error or errors detected;

input means to permit user definition of the threshold value against which the quality factor determined from the comparing means is compared to determined which bits are suspected to be in error; and means to detect the received baseband transmission and provide a digital data stream, and data processing means receiving the digital data stream and receiving the output from the signalling means, said data processor providing error correction for said digital data stream by substituting the complementary logic value to that detected for each bit or bits suspected to be in error.

9. Apparatus as claimed in claim 8, further comprising means for signalling those bits suspected to be in error.

10. Apparatus as claimed in claim 8, wherein the error correction procedure is a cyclic redundancy check conducted on the digital data stream.

* * * * *